(No Model.) 2 Sheets—Sheet 1.

R. B. MOORE.
ROSETTE TURNING CUTTER HEAD.

No. 484,221. Patented Oct. 11, 1892.

Witnesses:
J. H. Morse
J. A. Bayless

Inventor,
Robert B. Moore
By Dewey & Co.
Attys (No Model.) 2 Sheets—Sheet 2.

R. B. MOORE.
ROSETTE TURNING CUTTER HEAD.

No. 484,221. Patented Oct. 11, 1892.

Witnesses,
J. H. Rouse
J. A. Bayless

Inventor,
Robert B. Moore
By Dewey & Co.
Attys

UNITED STATES PATENT OFFICE.

ROBERT B. MOORE, OF SAN FRANCISCO, CALIFORNIA.

ROSETTE-TURNING CUTTER-HEAD.

SPECIFICATION forming part of Letters Patent No. 484,221, dated October 11, 1892.

Application filed March 21, 1892. Serial No. 425,817. (No model.)

*To all whom it may concern:*

Be it known that I, ROBERT B. MOORE, a citizen of the United States, residing in the city and county of San Francisco, State of California, have invented an Improvement in Turning Cutter-Heads; and I hereby declare the following to be a full, clear, and exact description of the same.

My invention relates to a head to hold cutters for turning rosettes in wood, such as are employed for ornamental finishing for door and window casings and for other purposes.

It consists in certain details of construction, which will be more fully explained by reference to the accompanying drawings, in which—

Figure 1:
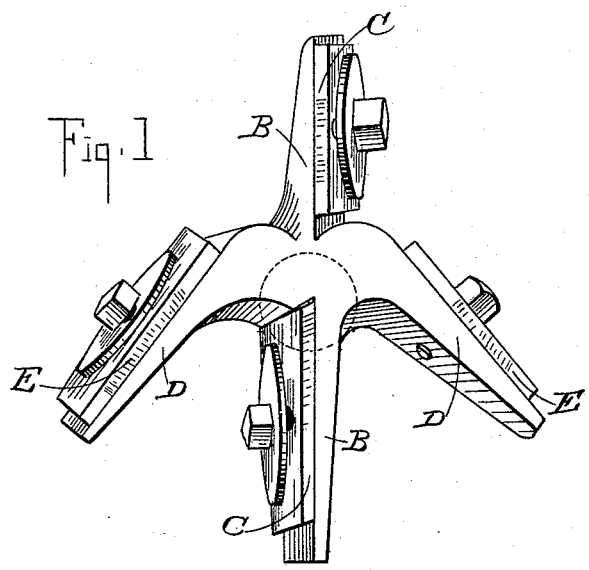
Figure 2:
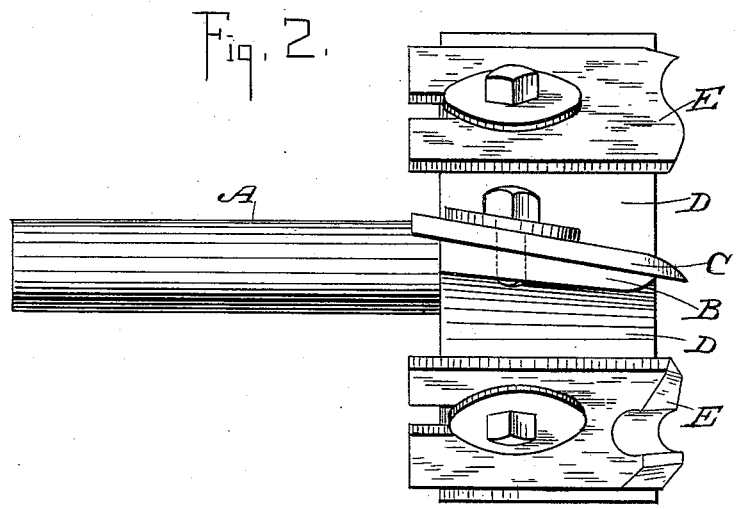
Figure 3:
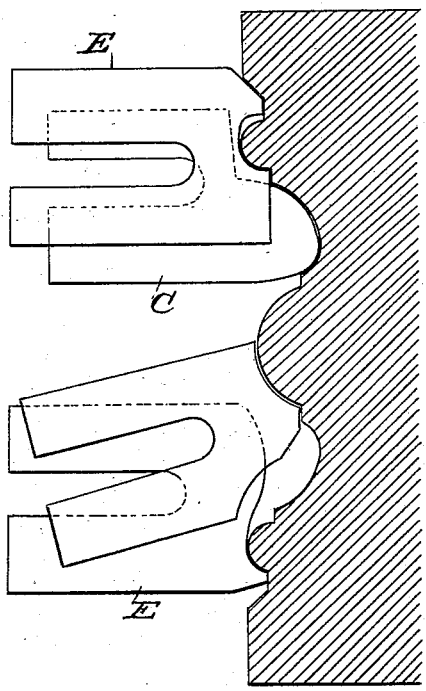

Figure 1 is a front end view of my improved cutter-head. Fig. 2 is a side view of the same. Fig. 3 shows the cutters in position for forming the different curves of the rosette.

Heretofore it has been customary to form the cutter-heads with two oppositely-disposed radial plates, upon which the cutting-knives of any desired shape are secured. With this construction, and especially where soft wood is being employed, a large percentage of the pieces are spoiled by the tearing of the wood where a bead is formed.

In my improvement A is the shaft or spindle, which is secured in any suitable rotary driving apparatus.

B B are wings or plates, which are radial to the axis of the cutter-head and have holes made through them to receive bolts, by which the cutters C are secured to them. Instead of making the faces of these plates in a plane parallel with the axis of the cutter-head I have inclined them, as shown, so that they stand at an acute angle with the axis, and this presents the edges of the cutters to their work at a corresponding angle in the same manner that a plane-iron is inclined to its work, except that the inclination is in a much less degree in the present case.

D D are supplemental wings or flanges, which project from the cutter-head between the flanges or plates B. These supplemental wings do not stand radially with the axis of the cutter-head, but their faces are in planes which if continued would be tangent to a cylinder of small diameter formed around the axis of the cutter-head. The cutters E, which are secured to the faces of these wings by bolts, as shown, are thus so set with relation to the center of rotation that they make a drawing cut. By the use of these two wings with their cutters I am enabled to make one portion of the cutting-edge to cut one part of one side of any curved ornamentation within the rosette, while the other side would be cut by the edge of the other cutter. This is also important because it enables me to always set the cutters so as to make any number of ornaments having exactly the same shape and size. This overcomes the difficulty met with in the ordinary construction of cutters, where the grinding of any concaved cutting-edge continually enlarges the concavity, and correspondingly the sharpening of any convex-pointed cutting-edge continually reduces it in size, so that the cut made by such tools will be continually changed. With my arrangement the knives are so set with relation to each other as to maintain the same-sized cut and shape at all times.

Having thus described my invention, what I claim as new, and desire to secure by Letters Patent, is—

1. A head for rosette-cutting tools, consisting of the shaft having radial tool-supporting wings, in combination with the supplemental intermediate wings the faces of which are tangential to the periphery of a cylinder surrounding the axis of the cutter-head, substantially as herein described.

2. A rosette-cutting tool-head consisting of the rotary shaft having the radial and inclined tool-supporting wings, in combination with intermediate wings the faces of which support the tools in planes which are tangent to the periphery of a cylinder surrounding the axis of the cutter-head, substantially as herein described.

In witness whereof I have hereunto set my hand.

ROBERT B. MOORE.

Witnesses:
S. H. NOURSE,
J. A. BAYLESS.